US012225354B2

(12) United States Patent
Zihajehzadeh et al.

(10) Patent No.: US 12,225,354 B2
(45) Date of Patent: Feb. 11, 2025

(54) HEARING AID PERSONALIZATION USING MACHINE LEANING

(71) Applicant: Anhui Huami Health Technology Co., Ltd., Anhui (CN)

(72) Inventors: Shaghayegh Zihajehzadeh, Coquitlam (CA); Gabrielle Toupin, Vancouver (CA); Artem Galeev, Vancouver (CA); Yan Vule, Port Moody (CA); Kongqiao Wang, Anhui (CN)

(73) Assignee: Anhui Huami Health Technology Co., Ltd., Anhui (CN)

( * ) Notice: Subject to any disclaimer, the term of this patent is extended or adjusted under 35 U.S.C. 154(b) by 261 days.

(21) Appl. No.: 18/171,023

(22) Filed: Feb. 17, 2023

(65) Prior Publication Data

US 2024/0284126 A1 Aug. 22, 2024

(51) Int. Cl.
*H04R 25/00* (2006.01)

(52) U.S. Cl.
CPC ....... *H04R 25/505* (2013.01); *H04R 2225/39* (2013.01); *H04R 2225/41* (2013.01)

(58) Field of Classification Search
CPC .............. H04R 25/505; H04R 2225/39; H04R 2225/41; H04R 25/507; H04R 25/70
See application file for complete search history.

(56) References Cited

U.S. PATENT DOCUMENTS

| | | | |
|---|---|---|---|
| 8,781,142 B2 | 7/2014 | Olafsson et al. | |
| 9,294,849 B2 | 3/2016 | Burns et al. | |
| 9,648,430 B2 | 5/2017 | Dittberner et al. | |
| 10,636,405 B1 | 4/2020 | Kemmerer | |
| 10,823,960 B1 * | 11/2020 | Cho | H04R 1/1066 |
| 2020/0389740 A1 * | 12/2020 | Sabin | H04R 25/507 |

FOREIGN PATENT DOCUMENTS

CN 104717593 A 6/2015

OTHER PUBLICATIONS

Branda et al.; Motion Sensors In Automatic Steering Of Hearing Aids; pp. 237-247; Sep. 24, 2021.

Dillon et al.; the Trainable Hearing Aid: What Will It Do For Clients And Clinicians?; pp. 30-36; Apr. 2006; vol. 59; The Hearing Journal.

Yoon et al.; A Trainable Hearing Aid Algorithm Reflecting Individual Preferences For Degree Of Noise-Suppression, Input Sound Level, And Listening Situation; Clinical and Experimental Otorhinolaryngology; vol. 10, No. 1: 56-65, Mar. 2017.

* cited by examiner

*Primary Examiner* — Tuan D Nguyen
(74) *Attorney, Agent, or Firm* — Young Basile Hanlon & MacFarlane, P.C.

(57) ABSTRACT

Training data are obtained. Each training datum includes environment characteristics obtained based on sensor data. Respective user settings corresponding to the training data are obtained. At least one respective user setting corresponds to one training datum, and a respective user setting is indicative of a user preference of at least one parameter of a hearing aid device. A machine-learning model for the hearing aid device is trained to output values for the at least one parameter. The hearing aid device is reconfigured based on an output of the machine-learning model. Reconfiguring the hearing aid device includes using current environment characteristics as an input to the machine-learning model to obtain at least one current value for the at least one parameter and configuring the hearing aid device to use at least one current value.

20 Claims, 8 Drawing Sheets

HEARING AID PERSONALIZATION USING MACHINE LEANING

FIELD

The present disclosure relates generally to hearing aid devices and more specifically to personalization of hearing aid devices using machine-learning.

SUMMARY

A first aspect is a method that includes obtaining training data, obtaining respective user settings corresponding to the training data, training a machine-learning model for the hearing aid device to output values for the at least one parameter, and reconfiguring the hearing aid device based on an output of the machine-learning model. Each training datum of the training data can include environment characteristics obtained based on sensor data. At least one respective user setting of the respective user settings can correspond to one training data. A respective user setting of the respective user settings is indicative of a user preference of at least one parameter of a hearing aid device. The hearing device can be reconfigured by using current environment characteristics as input to the machine-learning model to obtain at least one current value for the at least one parameter, and configuring the hearing aid device to use at least one current value.

A second aspect is a system that includes a hearing aid device and a device communicatively connected to the hearing device. The hearing aid device includes a first processor. The first processor is configured to receive a parameter value and configure the hearing aid device to use the parameter value. The device includes a processor. The processor is configured to execute instructions to receive sensor data, extract environment characteristics from the sensor data, input the environment characteristics to a machine-learning model to obtain the parameter value for a parameter of the hearing device, and transmit a command to the hearing device to use the parameter value.

A third aspect is a non-transitory computer-readable storage medium of a hearing aid device that includes executable instructions that, when executed by a processor, perform operations to obtain training data, obtain respective user settings corresponding to the training data, training a machine-learning model for the hearing aid device to output values for the at least one parameter, and reconfiguring the hearing aid device based on an output of the machine-learning model. Each training data of the training data can include environment characteristics obtained based on sensor data. At least one respective user setting of the respective user settings can correspond to one training data. A respective user setting of the respective user settings is indicative of a user preference of at least one parameter of a hearing aid device. The hearing device can be reconfigured by using current environment characteristics as input to the machine-learning model to obtain at least one current value for the at least one parameter, and configuring the hearing aid device to use at least one current value.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
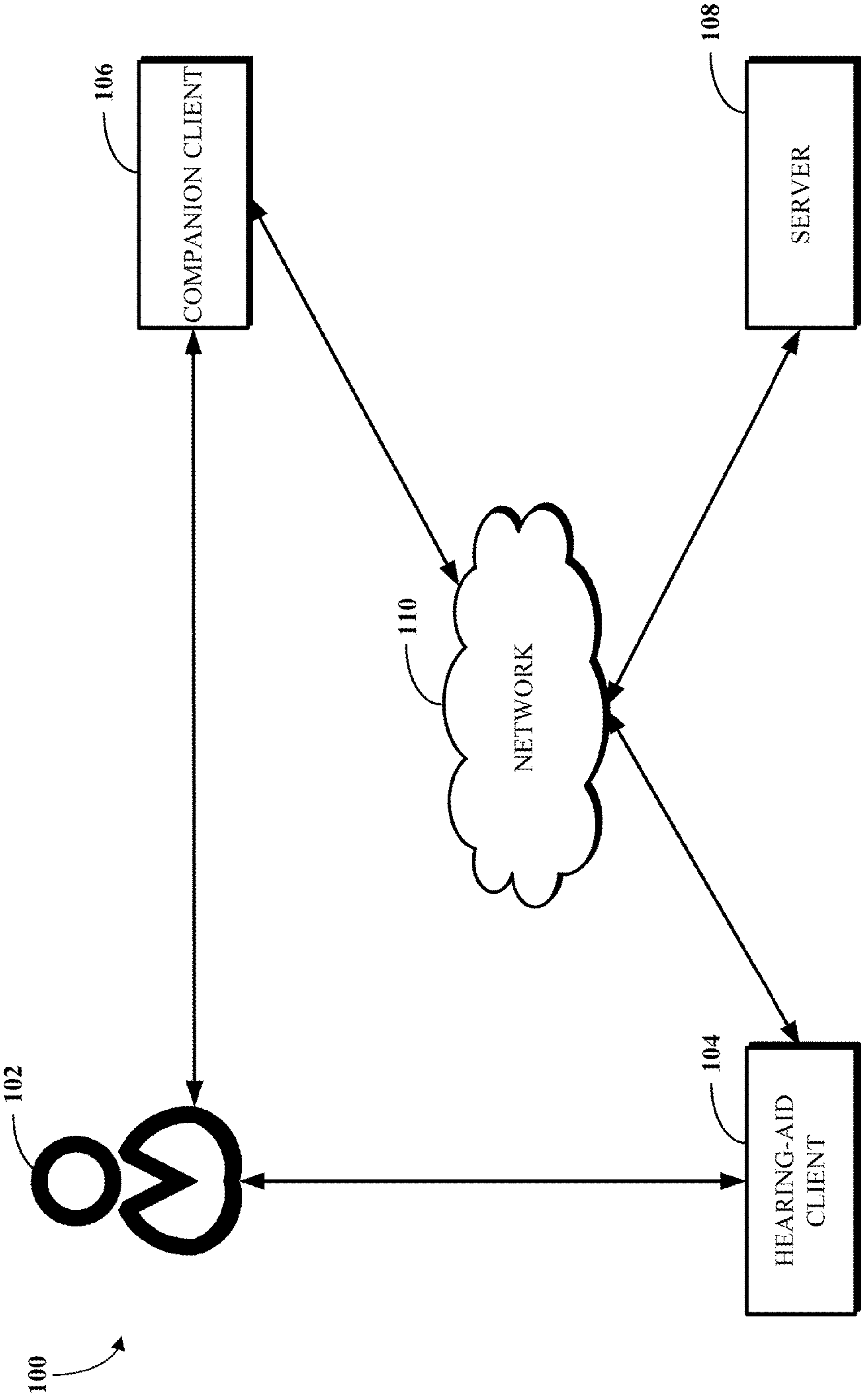
FIG. 1 is a block diagram of an example of an electronic computing and communications system where hearing aid personalization using machine-learning can be used.

As used herein, a "user" or "wearer" refer to a person who requires and/or wears a hearing aid device (i.e., a "hearing aid") to improve their auditory (e.g., hearing) experience.

In a typical scenario, a user suffering from hearing loss, may obtain a hearing-aid device from an audiologist (or some other hearing health care professional). The audiologist may perform an audiological examination to obtain an audiogram showing the results of the audiological examination. Using the audiogram, the audiologist can determine, for each ear, how well the user hears sounds in terms of frequency (e.g., high-pitched and low-pitched sounds), intensity, and loudness. The audiogram may indicate the softest sounds that the user can hear at particular frequencies. Based on the audiogram, the user may obtain a prescription for the hearing-aid device. The prescription can be thought of as a calculation of respective ideal amplification parameters (e.g., gain for low-frequency, high-intensity sounds) required at certain frequencies to restore audibility of certain sounds.

However, audiological examinations are typically performed in sound-proof environments (e.g., low-noise or low-reverberation environments). As such, the prescriptions obtained result in optimal fittings only for environments with the same or similar ideal acoustic characteristics. As such, prescriptive formulas obtained via audiological examinations can be said to result in prescriptions for the average person with a particular set of measured characteristics. However, some users may prefer settings that are different from the average settings. Additionally, such sound-proof environments cannot be reflective of all possible environments that may be encountered by users and the different auditory needs and/or preferences of the users in these disparate possible environments.

Furthermore, acoustic information alone may not always be sufficient for providing a clear indication of the soundscape and of the listening preferences of a user. User activity (such as being stationary, being in motion, undertaking intense physical activity, or the like) may drastically change these listening preferences. To illustrate, consider an outdoor cafe scenario involving a hearing-aid wearer and a conversation partner. A least two separate listening needs/preferences can be identified based on this setting. While sitting and conversing, the hearing-aid wearer may be facing the conversation partner. In this case, the user may prefer that the hearing aid optimally employ noise reduction and directionality to suppress the environmental sounds and focus more specifically on the conversation partner. However, if both parties stand up to leave and are still conversing, they are likely both facing forward to watch where they are going while continuing to communicate. In this case, the conversation partner is not directly in the line of sight of the hearing-aid wearer. While the environmental acoustics have not changed, the listening needs of the user have changed. For example, in this case, directionality may be somewhat detrimental to both communication and possibly even to safety. A less directional response may be preferred despite the acoustic indications.

Implementations and hearing aids according to this disclosure can solve problems such as these by using machine-learning to personalize and fine tune parameters of the hearing aids. "Fine tuning parameters" can mean identifying parameter values of parameters (e.g., configurations) of a hearing aid such that the parameter values result in an optimal (e.g., preferred) performance of the hearing aid for the user to suit the needs and preferences of the user. The parameters to be fine-tuned may be original parameters of an original prescription or previously fined tuned parameters (such as in cases where the preferences of the user change following experience with the hearing aid or if the hearing loss of the user fluctuates).

As is known, optimal amplification characteristics can vary based on the acoustics of an environment. As such, implementations according to this disclosure can learn the optimal parameter settings for a hearing aid based on the acoustics of different environments. A trainable hearing aid that is according to this disclosure can be used to learn optimal personalized settings and can automatically be adapted to the listening needs of the user in different environments. Machine-learning is used to personalize the hearing aid and identify parameter values that can result in optimal performance in different situations in terms of environmental factors and activities of the user.

A variety of sensors can be used to comprehensively measure the characteristics of an environment. The characteristics can include acoustic information, user activity, user location, light intensity, altitude, absolute height of a hearing aid, directionality of sound, other characteristics, or a combination thereof. The characteristics of the environment can be used to identify (e.g., infer, predict, calculate, or select) the listening needs. Identifying the listening need of a user can mean or include identifying parameters (i.e., parameter values) for configuring the hearing aid based on the environment characteristics. By using the environment characteristics to tune several parameters of a hearing aid, the effect of one parameter on other parameters can be captured and the overall setting of the hearing device can more accurately represent the optimal personalized setting for the user.

To summarize, setting of the hearing aid needs to be optimized for various activities of the user in different places with different acoustic characteristics. To describe some implementations in greater detail, reference is first made to examples of hardware and software structures used to implement hearing aid personalization using machine-learning. FIG. 1 is a block diagram of an example of an electronic computing and communications system (i.e., a system 100) where hearing aid personalization using machine-learning can be used. The system 100 may include a user 102, a hearing-aid client 104, a companion client 106, and/or a server 108. FIG. 1 illustrates a simplified view of the system 100. As can be appreciated the system 100 may include other components, such as load balancers, switches, or databases. The servers may be deployed or implemented in one or more datacenters (not shown in figure). While, for simplicity of explanation, the system 100 is shown as including one user (e.g., the user 102), but more users may be part of the system 100.

A client, such as the hearing-aid client 104 or the companion client 106, may be or otherwise refer to one or both of a device or an application implemented by, executing at, or available at the device. When the client is or refers to a device, the client can include a computing system, which can include one or more computing devices. For example, when the hearing-aid client 104 refers to a device, then the hearing-aid client 104 is a hearing-aid device. For example, when the companion client 106 refers to a device, then the companion client 106 may be computing device such as a mobile phone, a tablet computer, a laptop computer, a notebook computer, a desktop computer, or another suitable computing device or combination of computing devices that is capable of communicating with the hearing-aid device and/or the server 108. Where a client instead is or refers to a client application, the client can be an instance of software running on the device. In some implementations, a client can be implemented as a single physical unit or as a combination of physical units. In some implementations, a single physical unit can include multiple clients.

The user 102 is a wearer of the hearing-aid client 104. The hearing-aid device may include user-interface components (e.g., one or more buttons) that the user 102 may interact with (e.g., press) to cause the execution of functionality described herein. In some implementations, the user 102 may interact with the companion client 106 to cause the execution of functionality described herein.

The hearing-aid client 104 may include sensors that can be used to obtain signals (i.e., sensor data) related to a current environment of the user 102. The current environment of the user 102 refers to a current physical location of the user 102, current activities of the user 102, or both. The sensor data can be used to extract hearing-aid-derived environment characteristics (i.e., environment characteristics obtained from sensors embedded in the hearing-aid client 104). In some implementations, the hearing-aid client 104 may include one or more microphone, one or more global positioning system (GPS) sensors, one or more motion sensors (e.g., inertial and magnetic sensor module), one or more luminosity sensor, and/or one or more barometric pressure sensor.

The companion client 106 may include sensors that can be used to obtain signals (i.e., sensor data) related to a current environment of the user 102. The sensor data can be used to extract companion-derived environment characteristics (i.e., environment characteristics obtained from sensors embedded in the companion client 106). The hearing-aid-derived environment characteristics, the companion-derived environment characteristics, and any other derived environment characteristics are collectively referred to as "environment characteristics." In some implementations, the companion client 106 may include one or more of a GPS sensor module, one or more motion sensor (e.g., inertial and magnetic sensor module), one or more luminosity sensor module, and/or one or more barometric pressure sensor modules.

The companion client 106 may be, include, or implement an application (not shown in figure) that works in conjunction with the hearing-aid client 104. For example, the application may transmit configuration commands to the hearing-aid client 104 to set parameters of hearing-aid client 104. For example, the application may first train a machine-learning (ML) model using training data (e.g., obtained sensor data), and based on the trained ML model, generate output parameter values from input sensor data, and transmit configuration commands based on output parameter values of the ML model. For example, the application may train the ML model by obtaining training data and respective user setting (e.g., parameters adjusted by the user 102) corresponding to the training data, logging such training data and respective user setting, and training through ML algorithm or deep learning. Details are described below with reference to FIGS. 3 to 7. One or more of the steps described in this paragraph may be performed by the application (e.g., software) cooperatively with a server. Further, the application may include special features for recording and/or storing the real-time sensor data to capture environment characteristics, and utilize such recorded data to further train the ML model upon needs of the user 102.

The server 108 may be used to train the ML model for personalizing the hearing-aid client 104. In an example, the server 108 may receive sensor data from one or more of the hearing-aid client 104 and/or the companion client 106, and may extract the environment characteristics from the signal data. In an example, the server 108 may receive environment characteristics from one or more sensors of the hearing-aid client 104 and the companion client 106. The server 108 may be used to train the ML model to output values for the at least one parameter of the hearing-aid client 104. The server 108 may transmit the trained ML model to the hearing-aid client 104 or the companion client 106. Transmitting the ML model can mean transmitting the parameters of the ML model.

The hearing-aid client 104, the companion client 106, and the server 108 may communicate via the network 110. The network 110 can be or include one or more networks. The network 110 can be or include, for example, an internet, a local area network (LAN), a wide area network (WAN), a virtual private network (VPN), or another public or private means of electronic computer communication capable of transferring data between a client and one or more servers. In some implementations, a client can connect to the network 110 via a communal connection point, link, or path, or using a distinct connection point, link, or path. For example, a connection point, link, or path can be wired, wireless, use other communications technologies, or a combination thereof. The network 110 may be a Wi-Fi, a Bluetooth, a ZigBee network, or another type of short distance network. To illustrate, the companion client 106 and the server 108 may communicate over the Internet; and the hearing-aid client 104 and the companion client 106 may communicate via Bluetooth. In some implementations, the hearing-aid client 104 and the server 108 may communicate via the companion client 106. Each of the hearing-aid client 104, the companion client 106, and the server 108 can have a configuration that is at least partially similar to that of the computing device described with respect to FIG. 2.

Figure 2:
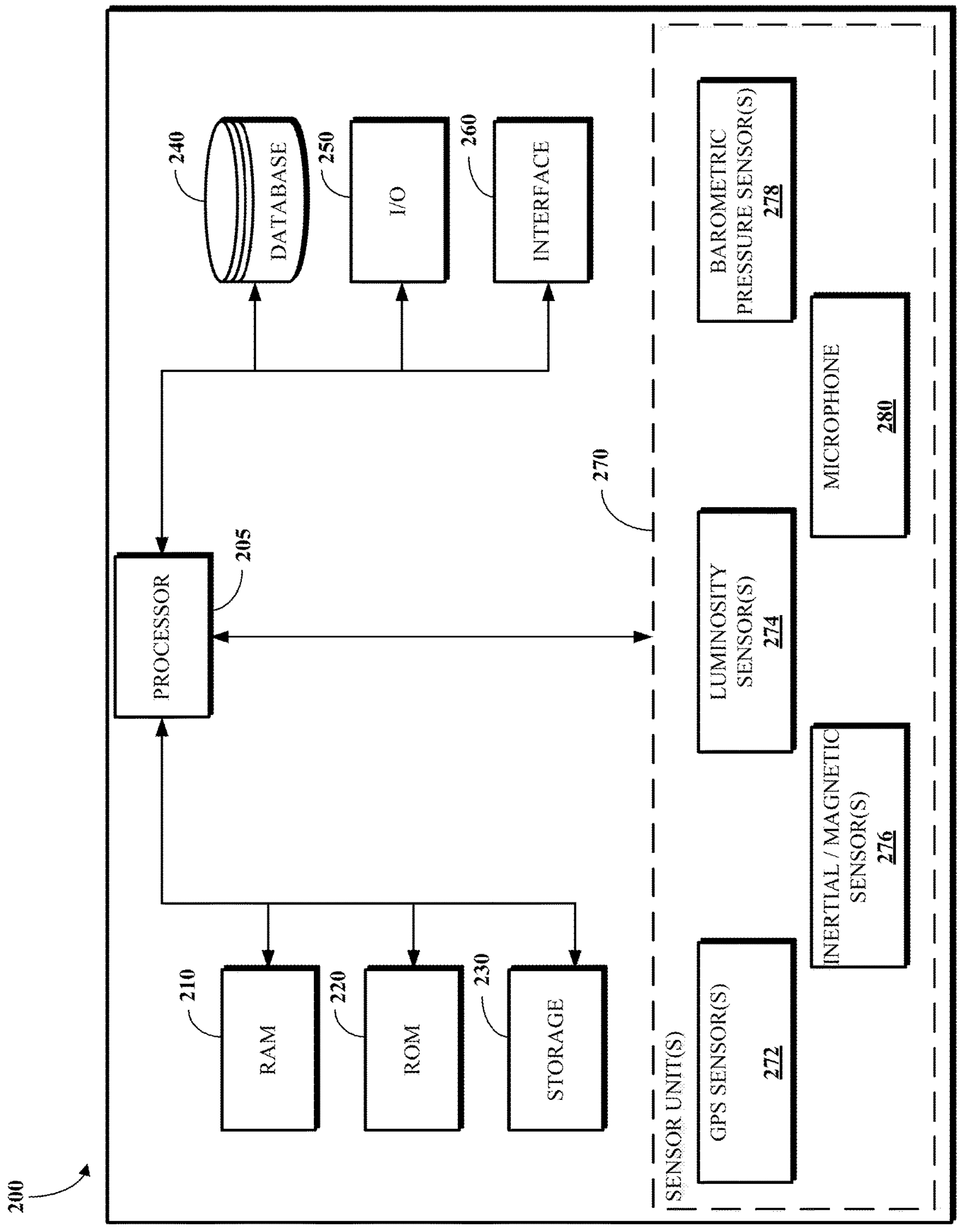
FIG. 2 depicts an illustrative processor-based, computing device, which is representative of the type of computing device that may be present in or used in conjunction with at least some aspects of a hearing-aid client, a companion client, a server or any other device that includes electronic circuitry.

FIG. 2 depicts an illustrative processor-based, computing device 200. The computing device 200 is representative of the type of computing device that may be present in or used in conjunction with at least some aspects of the hearing-aid client 104, the companion client 106, the server 108 of FIG. 1, and/or any other device that include electronic circuitry. For example, the computing device 200 may be used in conjunction with at least some of receiving sensor data, transmitting sensor data, processing received sensor data to obtain environment characteristics and storing, transmitting, or displaying information.

The computing device 200 is illustrative only and does not exclude the possibility of another processor- or controller-based system being used in or with any of the aforementioned aspects of system 100 of FIG. 1 or other aspects described herein. At least some aspects of the computing device 200 may be included, but others may not be or may not be used to implement the hearing aid personalization using machine-learning. For example, the server 108 may or may not include one or more sensor modules 270; for example, a sensor module of the hearing-aid client 104 of FIG. 1 may include different sensors than a sensor module of the companion client 106 of FIG. 1.

In one aspect, the computing device 200 may include one or more hardware and/or software components configured to execute software programs, such as software for the hearing aid personalization using machine-learning. For example, the computing device 200 may include one or more hardware components such as, for example, a processor 205, a random-access memory (RAM) 210, a read-only memory (ROM) 220, a storage 230, a database 240, one or more input/output (I/O) modules 250, an interface 260, and the one or more sensor modules 270. Alternatively and/or additionally, the computing device 200 may include one or more software components such as, for example, a computer-readable medium including computer-executable instructions for performing techniques or implement functions of tools consistent with certain disclosed embodiments. It is contemplated that one or more of the hardware components listed above may be implemented using software. For example, the storage 230 may include a software partition associated with one or more other hardware components of the computing device 200. The computing device 200 may include additional, fewer, and/or different components than those listed above. It is understood that the components listed above are illustrative only and not intended to be limiting or exclude suitable alternatives or additional components.

The processor 205 may include one or more processors, each configured to execute instructions and to process data to perform one or more functions associated with the hearing aid personalization using machine-learning. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 2, the processor 205 may be communicatively coupled to the RAM 210, the ROM 220, the storage 230, the database 240, the I/O module 250, the interface 260, and the one or more sensor modules 270. The processor 205 may be configured to execute sequences of computer program instructions to perform various processes or techniques, which will be described in detail below. The computer program instructions may be loaded into the RAM 210 for execution by the processor 205.

The RAM 210 and the ROM 220 may each include one or more devices for storing information associated with an operation of the computing device 200 and/or the processor 205. For example, the ROM 220 may include a memory device configured to access and store information associated with a hearing-aid client, a companion client, or a server. The RAM 210 may include a memory device for storing data associated with one or more operations of the processor 205. For example, the ROM 220 may load instructions into the RAM 210 for execution by the processor 205.

The storage 230 may include any type of storage device configured to store information that the processor 205 may use to perform functions and techniques consistent with the disclosed embodiments.

The database 240 may include one or more software and/or hardware components that cooperate to store, organize, sort, filter, and/or arrange data used by the computing device 200 and/or the processor 205. For example, the database 240 may include user profile information, historical activity and user-specific information, physiological parameter information, predetermined menu/display options, and other user preferences. Alternatively, the database 240 may store additional and/or different information. In some embodiments, the database 240 can be used to store recorded datasets (e.g., recorded sensor data, recorded parameter set). For example, sensor data, such as data obtained from the one or more sensor modules 270 may be selectively stored to the database 240.

In an example, the user may be in a time-sensitive situation where the user may not have time to adjust settings or parameters based on current sensor data, but he or she may still want to save (e.g., store) the sensor data, for example, to capture the environment characteristics of the current environment that the user is in so that hearing-aid parameters can be adjusted at later time based on the saved sensor data. In such case, the sensor data may be recorded and stored in the database 240 for later retrieval by the user upon user's convenience.

The I/O module 250 may include one or more components configured to communicate information with a user associated with the computing device 200. For example, the I/O module 250 may include one or more buttons, switches, or touchscreens to allow a user to input parameters associated with the computing device 200. The I/O module 250 may also include a display including a graphical user interface (GUI) and/or one or more light sources for outputting information to the user. The I/O module 250 may also include one or more communication channels for connecting the computing device 200 to one or more secondary or peripheral devices such as, for example, a desktop computer, a laptop, a tablet, a smart phone, a flash drive, or a printer, to allow a user to input data to or output data from the computing device 200.

The interface 260 may include one or more components configured to transmit and receive data via a communication network, such as the Internet, a local area network, a workstation peer-to-peer network, a direct link network, a wireless network, or any other suitable communication channel. For example, the interface 260 may include one or more modulators, demodulators, multiplexers, demultiplexers, network communication devices, wireless devices, antennas, modems, and any other type of device configured to enable data communication via a communication network.

The computing device 200 may further include the one or more sensor modules 270. Any sensor module within the one or more sensor modules may also be employed by or installed on the hearing-aid client 104 and the companion client 106. In one embodiment, the one or more sensor modules 270 may include one or more of a GPS sensor 272, a luminosity sensor 274, an inertial and magnetic sensor 276, a barometric pressure sensor 278, and/or a microphone 280. These sensors are only illustrative of a few possibilities and the one or more sensor modules 270 may include alternative or additional sensors suitable for use in the hearing-aid client 104 and companion client 106.

Although the one or more sensor modules are described collectively as the one or more sensor modules 270, any one or more sensors or sensor modules within the hearing-aid client 104 and/or the companion client 106 may operate independently of any one or more other sensors or sensor modules. Moreover, in addition to collecting, transmitting to the processor 205, and receiving from the processor 205 signals or information, any one or more sensors of the one or more sensor module 270 may be configured to collect, transmit, or receive signals or information to and from other components or modules of the computing device 200, including but not limited, to the database 240, the I/O module 250, or the interface 260.

Sensor data from the GPS sensor 272 and/or the luminosity sensor 274 may be used to determine an environment (i.e., environment characteristics therefor) where the user is currently located in and associated acoustic characteristics. The GPS sensor 272 can be used to detect location information of the user. The location information may include coordinate information with longitude and latitude. Such location information may be used with other sensor data to facilitate an accurate depiction of the environment characteristics. The luminosity sensor 274 (e.g., light sensor) may be used detect or collect light energy, which can be converted to electrical signals (e.g., luminosity signals). Luminosity data from the luminosity sensor 274 can be used to extract environment characteristics as light information may be used to determine the types or characteristics of the environment that the user is currently located in.

The microphone 280 can be used to detect sound, create a sound signal, and possibly amplify the sound signal. The microphone 280 can have polar patterns (e.g., pickup patterns), which may be selectable by the user. The polar patterns may include omnidirectional, unidirectional, or bidirectional patterns. The polar patterns may represent one or more directional characteristics and/or angle-dependent sensitivity of the microphone 280. As such, a polar patterns may be used to detect directionality of sound (such as the voice of the user, ambient sounds, or sounds including voices of other people in the environment of the user) and/or define levels of signals that are to be detected by the microphone 280 from different directions.

As described above, the computing device 200 may acquire sensor data from one or more sensors, and these sensor data in combination may be used to determine environment characteristics along with user's motions and location. In an example, these sensor data may be used to extract environment characteristics, which may be used along with user preferences (e.g., user-adjusted parameters based on such sensor data input) to train an ML model such that the ML model may generate output parameters based on the input sensor data (or acquired signals). For example, based on the sensor data input, the trained ML model may predict (e.g., identify, select, infer, etc.) personalized preferences or settings and generate output parameters.

Figure 3:
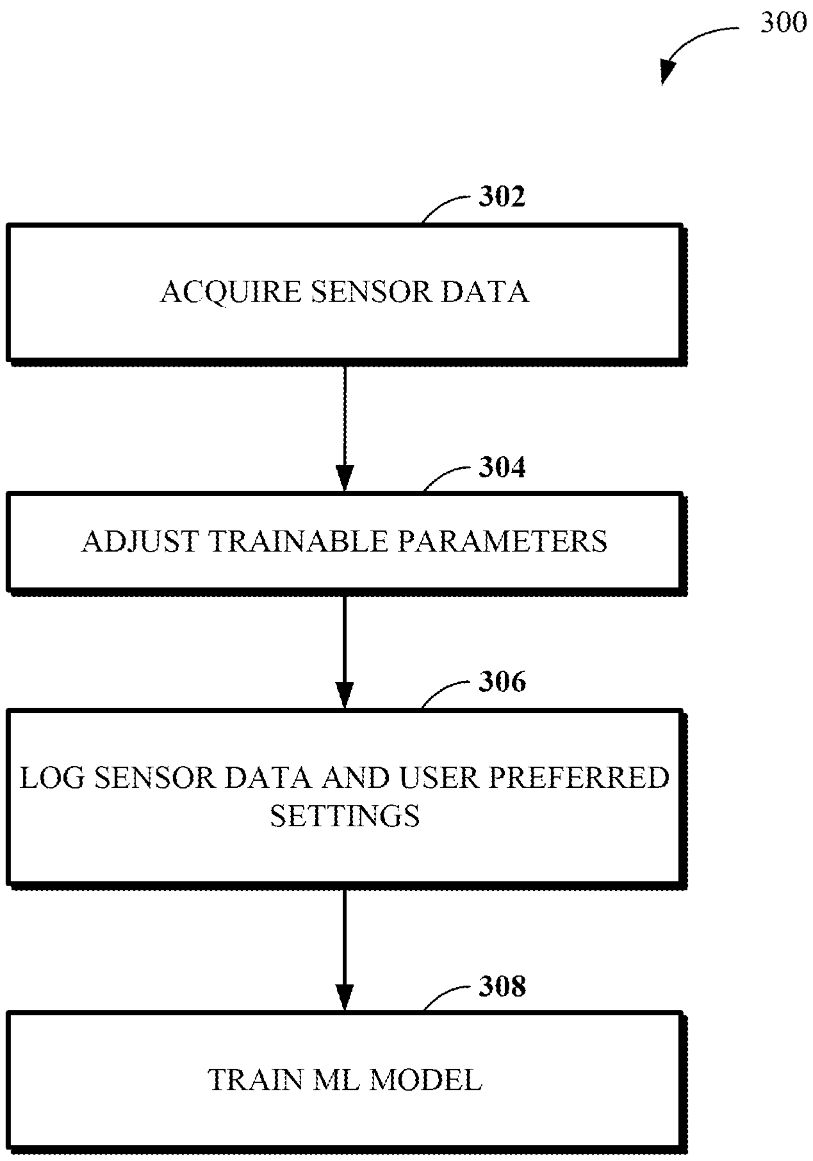
FIG. 3 is a flowchart diagram of an example of a technique for training a machine-learning model using sensor data as training data set.

FIG. 3 is a flowchart diagram of an example of a technique 300 for training the ML model using sensor data as training data set. The technique 300 may be implemented by a processor-based device, such as a hearing aid (e.g., computing device 200), the hearing-aid client 104, the companion client 106, and/or the server 108.

As further described herein, the environment characteristics (derived from sensor data) can be used to train an ML model. The ML model can be trained to map environment characteristics to optimal parameters (i.e., optimal parameter values) for configuring the hearing-aid client 104. During an inference phase, the environment characteristics can be used as input to the ML model to obtain optimal parameters corresponding to the environment characteristics and are used to configure the hearing aid or the hearing-aid client 104 of the hearing aid. In the inference phase, the sensor data representing environment characteristics, such as data (and/or signals) derived from sensors of the sensor modules 270, may be acquired and inputted into the ML model, and the ML model may predict personalized settings and output optimal parameters.

During a training phase, a collection of environment characteristics (derived from sensor data) is used as training data. Each set of environment characteristics of the collection is included in a training datum. The user 102 of FIG. 1 can provide a user setting corresponding to the training datum. The user setting includes a preferred configuration value of a parameter of the hearing-aid client 104 given the environment characteristics. To illustrate, using but a simple example, the environment characteristics may be obtained in or may be descriptive of a quiet environment that includes another speaker that is facing the user 102 and the user setting obtained from the user 102 may include a 10 decibel (dB) gain in the left ear and 40 dB gain in the right ear for frequencies in the 20-20,000 Hertz frequency range.

In an example, the ML model may be trained at the server 108 of FIG. 1. In another example, the ML model may be trained at the hearing-aid client 104 of FIG. 1. In yet another example, the ML model may be trained at the companion client 106 of FIG. 1. It is noted though, that the hearing-aid client 104 and the companion client 106 need to have sufficient battery charge to train of the ML model. The training data are transmitted to the device or server 108 where the training is to be performed. For example, if the training is to be performed at the server 108, any environment characteristics and the corresponding preferred configuration value obtained from the user 102 are transmitted to the server 108. That is, hearing-aid-derived environment characteristics and the companion-derived environment characteristics are transmitted to the server 108.

Prior to training the hearing aid to provide personalized settings, as described herein, the hearing aid may operate according to default settings, which may be based on an audiogram of the user. The default settings may be used to set (i.e., as a starting point for setting) the trainable parameters. For personalization (or for customization based on user preferences), the sensor data may be collected from various environments and logged. In an example, when the user 102 encounters a new environment and the user 102 feels uncomfortable or feels the need to adjust the parameters (i.e., that the current hearing aid parameter settings do not reflect or implement a hearing intent of the user), the user 102 may initiate adjustment of the parameters (e.g., trainable parameters). A "hearing intent" refers to how the user prefers to hear (or experience) a certain environment. That is, from the perspective of the user, hearing intent is a subjective measure. However, from an objective perspective, the hearing intent is embodied in a particular hearing aid parameter settings.

At 302, the technique 300 acquires sensor data from the hearing aid such as the computing device 200. The sensor data may include location data (or GPS latitude and longitude signal) including longitude and latitude, luminosity data (or luminosity signal), motion data (or motion signal), altitude and/or barometric pressure data (or barometric pressure signal), and/or microphone data (or microphone signal) derived from the GPS module, the luminosity sensor module, the initial and magnetic sensor module, the barometric pressure sensor module, and the microphone module, respectively. These sensor data may collectively be used to identify or extract environment characteristics.

For example, the user 102 may be at certain location and equipped with the hearing aid (e.g., computing device 200) which has embedded sensors or sensors (e.g., sensor modules 270) that are electrically or wirelessly connected to such hearing aid, and the sensors may detect various signals associated with the environment characteristics. The sensors may, depending on processing power of the hearing aid, memory configurations and capacity, and/or user preferences, perform continuous real-time detection, periodic detection, or manual detection (such as in response to user input to initiate the detection). Moreover, not all sensors of the hearing aid need to be initiated. That is, sensors may be selectively initiated.

At 304, the user 102 may adjust trainable parameters to personalize the settings. The trainable parameters may include shape of the nonlinear gain-frequency response which includes intensity (volume) and gain-frequency slope, depth and speed of automatic noise suppression, selection and speed of adaptive directionality, compression speed, spectral enhancement, frequency compression, etc. An application or software may be used by the user 102 to provide personalized settings for at least some of these hearing-aid parameters. For example, given a training datum, user input indicating the personalized settings can be received from the user 102. To illustrate, while the user 102 is in a current environment, environment characteristics can be captured and the user 102 may initiate the application or software to provide the personalized settings corresponding to the environment characteristics. That is, while the user 102 is in the environment, the user 102 may provide adjustment values for at least one of the parameters until the user is satisfied with the hearing quality. The personalized parameters can then be stored in association with the environment characteristics.

In an example, the noises and sounds of the current environment may be recorded for later playback. The recording may be initiated by the user 102 via a user interaction with the companion device or the hearing aid. At a later time, the user 102 may initiate playback of the recoded noises and sounds via the hearing aid (i.e., the user 102 hears the playback through the hearing aid). During the playback, the user 102 can provide the personalized settings. Providing the personalized settings may be a trial-and-error or an iterative process.

In some implementations, the application or software may run on one or more of the hearing-aid client 104 of FIG. 1, the companion client 106 of FIG. 1, and/or the I/O module 250 of the computing device 200 of FIG. 2. For example, the user interface may be a touchscreen, a physical button, a slider, a voice recognition interface, etc. In some implementations, based on the environment characteristics, the application or software may be configured to generate one or more recommendations that represent different combinations of levels of different parameters. Such recommendations may be used as a starting point for the user 102 to selectively adjust the parameters (e.g., trainable parameters).

Given environment characteristics (i.e., a training datum), the user may manually adjust the parameters through user interfaces. In an example, the user 102 may slide each and every parameters, or user-selected parameters to user preferred level. In an example, A/B testing techniques can be implemented by the application or software. In an example, the user 102 may change a parameter setting from a first value to a second value. The application or software may replay the sound using the first value and the second value and prompt the user 102 to identify which of the first value or the second value provides a better quality sounds for the hearing intent of the user. In an example, the user 102 can associate a label, a tag, or the like with the hearing intent constituting the set of personalized settings corresponding to the environment characteristics. In an example, the user 102 can store such label, tag, or the like in a memory, such as the database 240, a memory of the companion device or the hearing aid, and later retrieve such label, tag, or the like at user's discretion.

For example, in volume adjustment mode, the user 102 may make manual adjustments to the overall output volume via the user interface to add or subtract a certain offset (e.g., in 1 dB steps) from current volume level. With regards to gain-frequency response, the user 102 may change the slope of the frequency response until the desired slope is reached. With regards to directionality and its pattern, the user 102 may select among omnidirectional, unidirectional, and bidirectional patterns of the microphone module. With regards to noise suppression, the user 102 may set the signal-to-noise ratio (SNR). With regards to compression speed, the user 102 may choose the speed ranging from fast to slow compression speed, and set attach time and release time of the compressor. Fast compression may result in a lower quality sound output by the hearing aid as compared to that of a slower compression speed. With regards to frequency compression, the user 102 may select compression cut-off frequency and ratio. The disclosure herein is not limited to any particular user interface designs for providing such adjustments. It is recognized, that, for example, the term "gain-frequency response," "signal-to-noise ratio," or any such technical terms that characterize a hearing-aid may be completely meaningless to the average user. As such, the user interface designs can be such that the user 102 is shielded from such terms.

For example, the user 102 may associate the label depending on the situation that the user 102 encounters along with the hearing intent of the user 102. For example, in a setting where the user 102 is sitting in a restaurant and the user's partner is in front of the user 102, the hearing intent of the user may be to listen to the sound that comes from the partner, and thus, from the front side of the user 102. The user may adjust the parameters based on the user's preference, and prior to, after, or while adjusting the parameters, the user may associate a label (e.g., "at restaurant") corresponding to the adjusted parameters.

In another example, the user 102 may be walking on busy streets in Manhattan, New York. The streets may be noisy and dangerous. In this scenario, the user 102 may wish to hear all surrounding sounds as safety may outweigh any other aspect (e.g., having conversations with the partner who is walking besides the user 102). As such, prior to, after, or while adjusting the parameters, the user 102 may associate a label (e.g., "busy streets") correspondingly.

In another example, the user 102 may attend a conference and there may be many people talking around the user 102 as well as music playing in the background. The user 102 may just want to relax and listen to the background music. As such, the hearing intent of the user is to listen to background music. Prior to, after, or while adjusting the parameters, the user 102 may associate a label (e.g., "conference hall/relax mode") correspondingly.

Next, at 306, the sensor data acquired from step 302 and the user preferred settings or adjusted trainable parameters from step 304 may be logged (e.g., stored, transmitted for storage) into the application, the software, and/or the server 108. When the sensor data and the adjusted trainable parameters are logged or data logging is initiated, the user's preferred settings and the sensor data are saved in raw or processed format to the memory such as the RAM 310, the ROM 320, the storage 330, or the database 240 of FIG. 3.

For example, using sensor data from a microphone, some acoustic signal features that can be logged may include the spectral shape, rate, and extent to which the spectral shape varies, the apparent direction of sound, the modulation of sound within each frequency channel, and the way these modulations can match each other across audio channels. For example, sensor data from a GPS sensor can be used to log the latitude and longitude information. For example, luminosity data (e.g., light intensity data) can be logged using sensor data from a luminosity sensor. For example, triaxial acceleration, rate of turn, and magnetic information can be logged according to a certain frequency (e.g., at 25 Hz). For cases where there are limitations on available memory available for saving raw sensor signals, a set of statistical time domain and frequency domain features, such as of the tri-axial signal, can be logged instead. Further, raw barometric pressure data or data converted to the altitude can be logged at a certain frequency (such as a frequency of 4 Hz) using the barometric pressure sensor.

Once the data are logged, the user 102 may manually stop data logging or else the data logging can be stopped after a certain period of time spent gathering the required information or data. At the end of each data logging session, the user's preferred settings as well as the sensor data may be saved in the memory, such as the database 240, the server 108, or a memory of the companion client 106 or a memory of the hearing-aid client 104.

At step 308, the ML model can be trained using the logged sensor data and the logged user preferred settings. In some implementations, the hearing aid may automatically initiate model training once enough data are logged on the hearing aid. In some implementations, the user 102 may cause the initiation of the model training via a user interface.

In some implementations, one or more ML models may be selectively trained. For example, each of the ML models may be trained to output personalized parameters for one of the parameters of the hearing aid, which can provide flexibility with respect to successive training whenever new training data are available. For example, one user might only want to focus on the intensity and slope of the frequency response. In another example, one ML model may be trained to output respective personalized parameters for each of the parameters of the hearing aid. Such an ML model can take into account correlations between the different trainable parameters and the influence of one parameter on at least some of the other parameters. As such, the single model can predict a more accurate and optimal individualized hearing aid setting in various environments.

Once the training phase is complete, the device may keep collecting information from various sensor modules, and automatically (or manually upon needs of the user 102) and adaptively sets the hearing aid parameters for each individual user based on their preferences.

Figure 4:
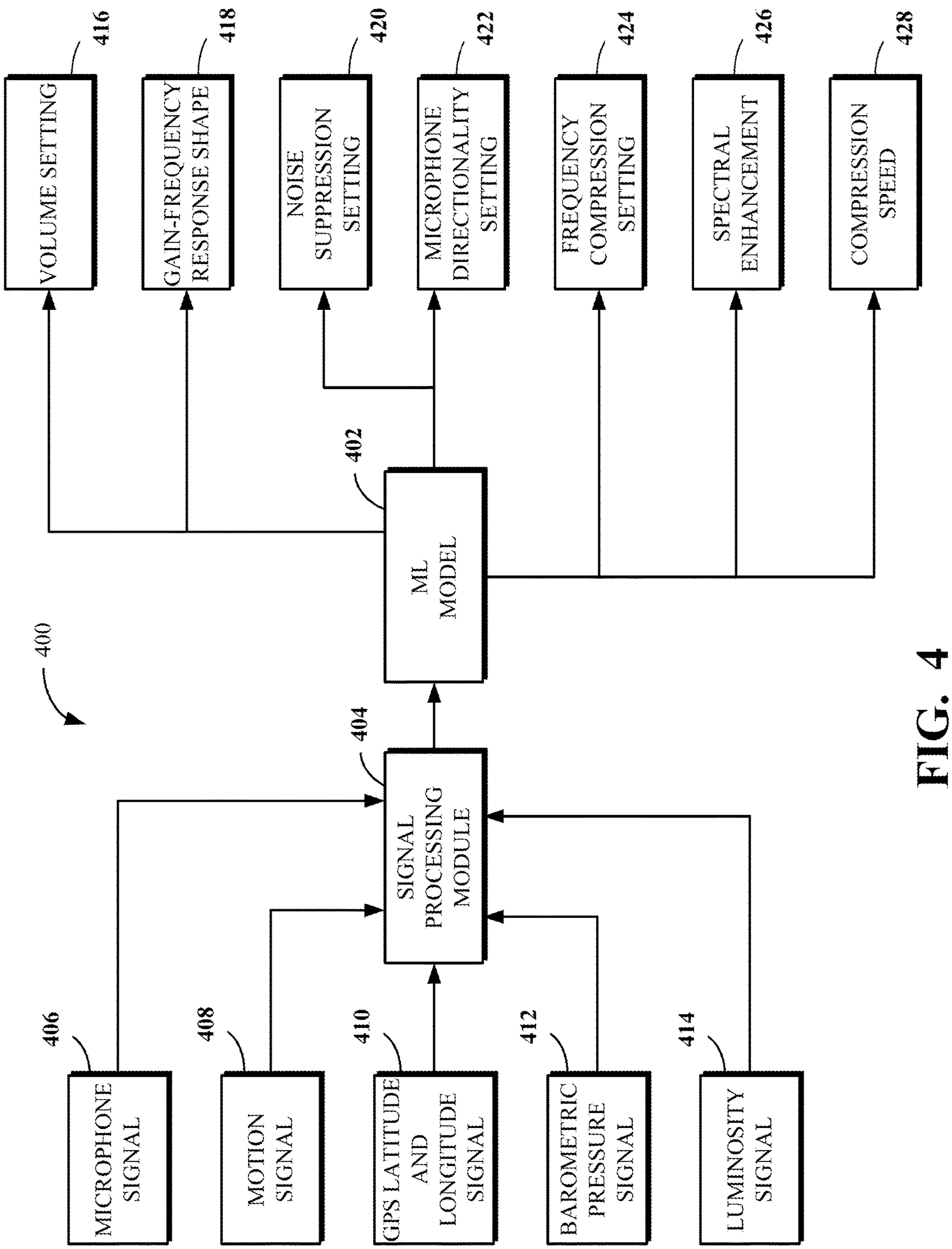
FIG. 4 is a flowchart diagram of a technique for receiving, processing, and transmitting various signals to a machine-learning model.

FIG. 4 is a flowchart diagram of a technique 400 for receiving, processing, and transmitting various signals to an ML model 402 to generate optimal parameters for a hearing aid. The technique 400 may be implemented by a hearing aid (e.g., the computing device 200), the hearing-aid client 104, the companion client 106, and/or the server 108. The computing device 200 is representative of the type of computing device that may be present in or used in conjunction with at least some aspects of the hearing-aid client 104, the companion client 106, the server 108 of FIG. 1, or any other device that include electronic circuitry. For example, the computing device 200 may be used in conjunction with at least some of receiving sensor data, transmitting sensor data, processing received sensor data to obtain environment characteristics and storing, transmitting, or displaying information.

The technique 400 may include a signal processing module 404 positioned in, on, or communicatively (e.g., wired or wirelessly) connected to the computing device 200. The signal processing module 404 may be the processor of the computing device 200. The signal processing module 404 may receive various input signals including, but not limited to, microphone signals 406, motion signals 408, GPS latitude and longitude signals 410, barometric pressure signals 412, and/or the environment brightness signals (i.e., luminosity signals 414) derived from a microphone, an inertial and magnetic sensor, a GPS sensor, a barometric pressure sensor, and a luminosity sensor of the computing device 200, respectively. The signal processing module 404, after receiving the various input signals, may process such signals before transmitting them to the ML model 402.

In some implementations, the signal processing module 404 may be positioned in, on, or communicatively (e.g., wired or wirelessly) connected to the hearing-aid client 104 and/or the companion client 106. In some implementations, the signal processing module 404 may be a processor of the hearing-aid client 104 and/or the companion client 106. In some implementations, signal processing module 404 may be communicatively (e.g., wired or wirelessly) connected to the server 108. In some implementations, the signal processing module 404 may be the server 108.

As described above, the computing device 200 may be present in or used in conjunction with the hearing-aid client 104, the companion client 106, the server 108 of FIG. 1. As such, one or more of the sensor modules within the sensor modules 270, may be communicatively (e.g., wired or wirelessly) connected to the hearing-aid client 104, the companion client 106, and/or combination thereof. Sensor data or signals derived from these sensor modules may collectively help identify or extract environment characteristics.

For the hearing aid (e.g., computing device 200), the hearing-aid client 104, the companion client 106) and/or the server 108 to extract features, information, and/or environment characteristics from various types of signals, different types of signals may be processed. With regards to how different types of signals may be processed, several example implementations employed by the signal processing module 404 are described as follows.

In an example, the microphone signal or an audio signal may be digitized in order to carry out various preprocessing and machine-learning techniques. For example, the microphone signal or the audio signal may be transformed or converted, using a log-Mel spectrogram, into a feature representation and/or an image representation of such microphone signal or audio signal. In such transformation or conversion using the log-Mel spectrogram, the microphone signal or the audio signal undergoes a short-time Fourier transform to achieve spectrograms based on the frequency and amplitude of such signal. The spectrograms may then be scaled to the Mel scale and saved as images.

In an example, with regards to motion signal processing, an accelerometer and gyroscope signals and/or data derived from the initial and magnetic sensor module (e.g., accelerometer, gyroscope, and/or magnetometer) may be processed through a sensor fusion algorithm (e.g., Kalman filter or different variation of Kalman filter such as extended Kalman filter) to output orientation information (e.g., roll, pitch, and yaw angles) as well as external acceleration (e.g., gravity-compensated acceleration).

In an example, with regards to barometric pressure signal processing, a signal or data representing barometric pressure information is converted to a signal or data representing an altitude information to complement GPS data. The signal or data representing the altitude information may then be low-pass filtered to provide smoother input for the ML model. In an example, the ML model may incorporate the deep learning algorithm. The ML model may be installed as software or application in the hearing aid such as the computing device 200, the server 108, the hearing-aid client 104, the companion client 106, and/or any device with processing power to handle ML algorithm and processing.

Once the ML model 402 receives or takes all signal and/or data inputs from the signal processing module 404, hearing-aid client 104, companion client 106, and/or the server 108, the ML model 402 may generate or output one or more personalized parameters including one or more of a volume level setting 416, a gain-frequency response shape parameter 418, a noise suppression setting parameter 420, a selection and speed of microphone directionality setting 422, a frequency compression setting 424, a spectral enhancement setting 426, a compression speed setting 428, more setting, fewer setting, or a combination thereof.

As signal inputs to the ML model 402 may be in different sizes and/or formats that cannot be immediately combined, the signal inputs may require further processing. For example, the log-Mel spectrograms are two-dimensional images while each axis of the processed motion signal is one-dimensional timeseries data. Moreover, the GPS sensor data, barometric pressure sensor data, and luminosity sensor data may be scalar values. Such data combinability issues may be resolved through a processing technique employing a multi-branch processing scheme, which is discussed with respect to FIG. 5.

Figure 5:
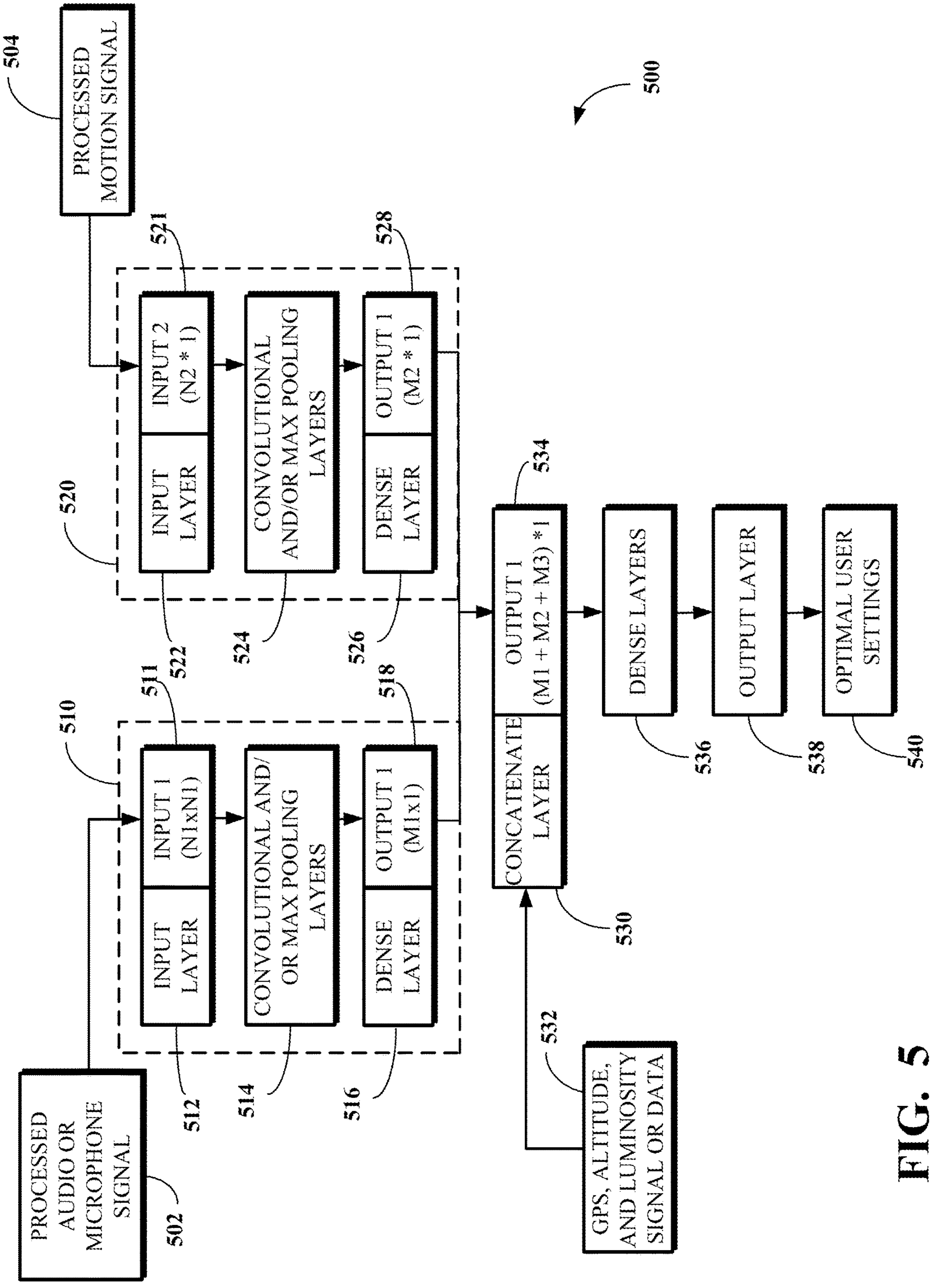
FIG. 5 is a flowchart diagram of a technique for combining various signals having different sizes and/or format using a multi-branch processing scheme.

FIG. 5 is a flowchart diagram of a technique 500 for combining various signals having different sizes and/or formats using a multi-branch processing scheme. The technique 500 may be utilized by the hearing aid (e.g., computing device 200), the hearing-aid client 104, the companion client 106, a server 108, and/or a device which utilizes or implements the ML algorithm or model. The computing device 200 is representative of the type of computing device that may be present in or used in conjunction with at least some aspects of the hearing-aid client 104, the companion client 106, the server 108 of FIG. 1, or any other device that include electronic circuitry. For example, the computing device 200 may be used in conjunction with at least some of receiving sensor data, transmitting sensor data, processing received sensor data to obtain environment characteristics and storing, transmitting, or displaying information.

The processing scheme of processed signals may utilize an architecture that includes at least a first branch 510 and a second branch 520. The first branch 510 may further process the processed audio or microphone signal 502 (e.g., processed from the signal processing module 404) at or by a device where the ML model is utilized or trained, or any other devices equipped with such processing capabilities, such as the hearing aid, the computing device 200, the hearing-aid client 104, the companion client 106, and/or the server 108. The second branch 520 may further process the processed motion signal 504 (e.g., processed from the signal processing module 404) at or by a device where the ML model is trained, or any other devices that are equipped with such processing capabilities, such as the hearing device, such as the computing device 200, the hearing-aid client 104, the companion client 106, and/or the server 108.

The first branch 510 may further process or handle two-dimensional input sensor data 511 of size N1×N1, such as the processed audio or microphone signal 502, which can be log-Mel spectrogram data (which can be of N1×N1 sized images). The two-dimensional input sensor data are received at an input layer 512 of the ML model. In an example, and depending on the architecture of the ML model, the first branch 510 may include multiple convolutional and/or max pooling layers 514 and a dense layer 516 (e.g., one or more fully connected layers which connect output layer to the concatenation layer 530), which outputs a first output 518 that is of size M1×1 output. In some implementations, well known architectures such as ResNet or AlexNet may be used. To reiterate, the first branch 510 converts an N1×N1-sized input into M1 outputs.

The second branch 520 may further process or handle one-dimensional timeseries data 521 of size N2×1, such as processed motion signal 504, which are received at an input layer 522. Depending on the architecture of the ML model, the second branch 520 may be implemented as a depth-wise convolutional neural network with input layer for N2-long timeseries data, multiple convolutional and/or max-pooling layers 524, and a dense layer 526 (e.g., one or more fully connected layers which connect output layer to the concatenation layer 530) for M2 outputs (i.e., an output 528). As such, the second branch 520 may take L number (e.g., roll, pitch, yaw, and triaxial external acceleration) of N2-long timeseries data, and generate M2 outputs.

Once the M1 outputs (i.e., the first output 518) and M2 outputs (i.e., the output 528) are generated, they may be combined at a concatenation layer 530. The concatenation layer 530 may be connected to the dense layers 516 and 526 of the first branch 510 and the second branch 520, respectively. The concatenation layer 530 may combine the M1 outputs from the first branch 510 and the M2 outputs from the second branch 520. Moreover, the concatenation layer 530 may further combine scalar data 532 (such as signals related to latitude, longitude, altitude, and/or luminosity). Assuming that the combined scalar data 532 is of size M3, then the concatenation layer 530 would have M1+M2+M3 outputs (i.e., an output 534).

In some implementation, the ML model may include at least one fully connected layer (i.e., dense layers 536) that connects the concatenation layer 530 to an output layer 538. Accordingly, such outputs at the dense layers 536 may be transformed by the output layer 538. The output layer 538 may transform (e.g., generate) such outputs to final desired outputs, such as various hearing aid parameters (e.g., optimal user settings 540) described above. For example, such parameters (i.e., the optimal user settings 540) may include a shape of the nonlinear gain-frequency response setting, which may include intensity (volume) and gain-frequency slope settings, a depth and speed of automatic noise suppression setting(s), selection and speed of adaptive directionality setting(s), a compression speed setting, a spectral enhancement setting, a frequency compression setting, etc.

In an example, more specifically, the optimal user settings 540 may include a desired volume setting with a numerical scale (e.g., in the range of 0 to 100) that represents intensity of loudness of sound. In an example, more specifically, the optimal user settings 540 may include gain-frequency response shape setting with a numerical value that specifies the slope of gain-frequency response. In an example, more specifically, the optimal user settings 540 may include a noise suppression setting with a Boolean number for turning noise suppression on and off, and a scalar value to illustrate the level of the noise suppression. In an example, more specifically, the optimal user settings 540 may include microphone directionality setting with a numerical value which specifies each of omnidirectional, unidirectional (e.g., cardioid, supercardioid, hypercardioid), and bidirectional (e.g., figure-of-eight) patterns. In an example, more specifically, the optimal user settings 540 may include frequency compression parameters including compression ratio and compression threshold.

Once trained, the trained ML model generates a regression model that maps the sensor outputs to the optimal user settings.

Figure 6:
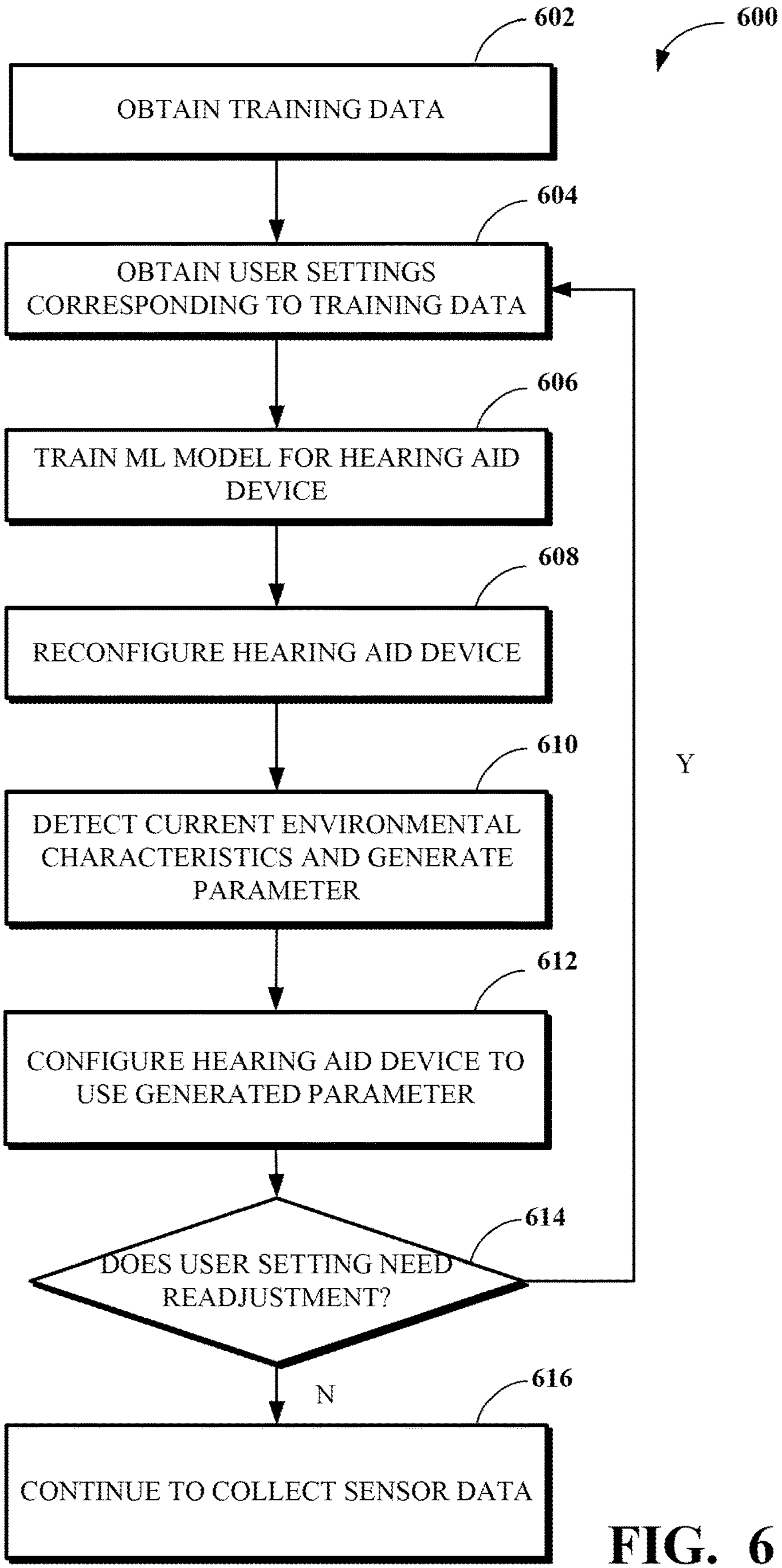
FIG. 6 is a flowchart diagram of an example implementation of training a machine-learning model, generating parameter output based on the trained machine-learning model, and configuring hearing aid device.

FIG. 6 is a flowchart diagram of an example of a technique 600 of training an ML model, generating parameter output from the trained ML model, and configuring a hearing aid based on the parameter. The technique 600 can be implemented by a processor-based device, such as a hearing aid (e.g., computing device 200), the hearing-aid client 104, the companion client 106, and/or the server 108. The computing device 200 is representative of the type of computing device that may be present in or used in conjunction with at least some aspects of the hearing-aid client 104, the companion client 106, the server 108 of FIG. 1, or any other device that includes electronic circuitry. For example, the computing device 200 may be used in conjunction with at least some of receiving sensor data, transmitting sensor data, processing received sensor data to obtain environment characteristics and storing, transmitting, or displaying information.

At 602, training data are obtained. The training data may include sensor data obtained from sensors included in a sensor unit sensor, such as the sensor modules 270 of FIG. 2. The sensor data can be obtained from one or more devices, such as a hearing aid and a companion device. The training data can be as described above. For example, each training datum may include location data, such as longitude and latitude (or GPS latitude and longitude signal), luminosity data (or luminosity signal), motion data (or motion signal), altitude and/or barometric pressure data (or barometric pressure signal), and/or microphone data (or microphone signal) derived from a GPS sensor, a luminosity sensor, an inertial and magnetic sensor, a barometric pressure sensor, and a microphone, respectively. These sensor data may collectively be used to identify or extract environmental characteristics.

For example, the user 102 of FIG. 1 may be at certain location and equipped with the hearing aid (e.g., computing device 200) and/or a companion device, which include embedded sensors or sensors that may be electrically or wirelessly connected to such hearing aid. The sensors may detect various signals associated with the environment characteristics. The sensors may, depending on processing power of the hearing aid, memory configurations and capacity, and/or user preferences, perform continuous real-time detection, periodic detection, or manual detection upon needs of the user. Moreover, not all sensors of the hearing aid need to be initiated. For example, depending on needs of the user or for optimal personalization, sensors may be selectively initiated.

At 604, one or more user setting (i.e., training user settings) corresponding to a training datum are obtained. For example, the user 102 may adjust trainable parameters to personalize the user settings. In an example, the user setting may be obtained via an application or software that may be executing or available at the companion device. The training user settings may include or may be processed to obtain the shape of the nonlinear gain-frequency response which includes intensity (volume) and gain-frequency slope, depth and speed of automatic noise suppression, selection and speed of adaptive directionality, compression speed, spectral enhancement, frequency compression, etc.

In some implementations, the application or software may run on either the hearing-aid client 104, the companion client 106, and/or the I/O module 250 of the computing device 200. The user 102 may adjust through user interfaces of the hearing-aid client 104, the companion client 106, and/or the I/O module 250. For example, the user interface may be touchscreen, physical button, slider, voice recognition interface, etc.

In some implementations, the application or software may be configured to generate one or more recommendations that represent different combinations of levels of different parameters of the hearing aid. Such recommendations may be used as a starting point for the user 102 to selectively adjust until a desired hearing level (quality) is achieved by the user 102. Based on the environment characteristics, the user 102 may manually adjust the parameters through user interfaces of the application or software.

When the user 102 encounters a new environment and the user 102 feels uncomfortable or feels the need to adjust the current parameters of the hearing aid, the user 102 may initiate adjustment of the parameters (e.g., training user settings).

For example, in volume adjustment mode, the user may make manual adjustments to the overall output volume via the user interface to add or subtract a certain offset (e.g., in 1 dB steps) from current volume level. With regards to gain-frequency response, the user 102 may change the slope of the frequency response until the desired slope is reached. With regards to directionality and its pattern, the user 102 may select among omnidirectional, unidirectional, and bidirectional patterns of the microphone module. With regards to noise suppression, the user 102 may set the signal to noise ratio (SNR). With regards to compression speed, the user 102 may choose the speed ranging from fast to slow compression speed, and set attach time and release time of the compressor. With regards to frequency compression, the user 102 may select compression cut-off frequency and ratio.

Once the user settings corresponding to the training data are obtained, the training data and the obtained user settings (e.g., training user settings) are logged (e.g., stored or transmitted for storage). In some implementations, prior to logging, the technique 400 may be utilized to process and transmit various signals (e.g., from the training data, from the sensor data) to the ML model. In some implementations, during and/or after the logging, the technique 500 may be utilized to combine the various signals (e.g., from the training data, from the sensor data) prior to training the ML model.

At 606, the ML model for the hearing aid may be trained using logged training data and logged user settings. In some implementations, the hearing aid may automatically initiate model training once enough data are logged on the hearing aid. In some implementations, the user 102 may cause the hearing device to initiate the model training through user interfaces, such as I/O module 250.

In some implementations, one or more deep learning models or one or more ML models may be selectively trained depending on the preferences of the user. For example, the user 102 may focus on training the deep learning model based on specific trainable parameters. In this case, the user 102 may select the specific trainable parameters in ML training mode through the user interfaces, such as the I/O module 250. As described above, more than one ML models may be trained.

At 608, the hearing aid may be reconfigured based on the trained ML model. That is, the trained model may be added to the hearing aid. In an example, the trained ML model may be added to a companion device. As such, personalized settings may be obtained from the trained ML model at the companion device and the companion device may transmit commands to the hearing aid to configure the hearing aid based on the personalized settings.

At 610, the hearing aid may detect current environment characteristics (e.g., sensor data, derived from the sensor data), and generate parameters (e.g., optimal user's settings) based on the current environment characteristics. For example, the sensors from the one or more sensor modules 270 may detect sensor data and extract environment characteristics from the sensor data by processing the data or signals using the hearing-aid client 104, the companion client 106, the hearing aid, the server 108, or the signal processing module 404. Then such extracted environment characteristics (e.g., represented by data or signals) may be used as input to the trained ML model such that the ML model may generate the parameters based on the extracted environment characteristics input.

At 612, the hearing aid may be configured to use the generated parameters (e.g., optimal user's settings). For example, the hearing aid may use the generated parameters responsive to a command transmitted from the hearing aid itself, the companion device, or some other device that incorporates the trained ML model.

At 614, the technique 600 determines whether user settings are to be readjusted. The determination can be made in response to a user input indicating that the user settings are to be readjusted. The user input may be received by the hearing aid or by the companion device. To illustrate, the user 102 of FIG. 1 may determine, based on what the user 102 hears through the hearing aid, whether to train or re-train the ML model or whether to adjust user setting or parameters such that the ML model may be re-trained. For example, the user 102 may feel or think that the parameters may be further optimized and decided to adjust the parameters. By doing so (e.g., adjusting the parameters), the hearing aid re-trains the ML model for the hearing aid. As such, when the user 102 determines to re-adjust the parameters, then the steps 604, 606, 608, 610, and 612 may be repeated.

If it is determined not to retrain the ML model or to not readjust the user settings or parameters, then at 616, the hearing aid may continue to collect sensor data from various sensors. For example, depending on processing power of the hearing aid, memory configurations and capacity, and/or user preferences, the hearing aid may perform continuous real-time detection, periodic detection, or manual detection upon needs of the user 102.

Figure 7:
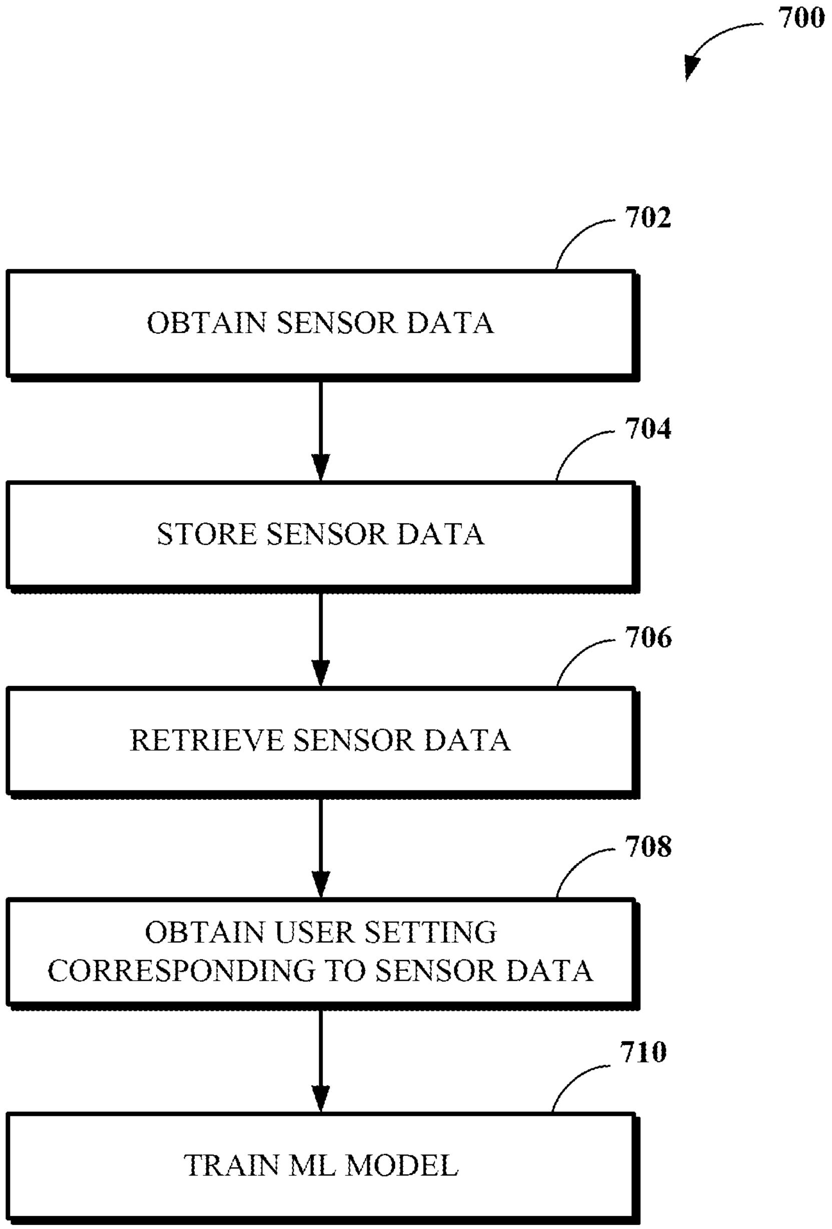
FIG. 7 is a flowchart diagram of an example implementation of storing sensor data, retrieving the stored sensor data, and training machine-learning model based on the retrieved sensor data.

FIG. 7 is a flowchart diagram of an example implementation 700 of retrieving the saved sensor data and training machine-learning model based on the retrieved sensor data.

The example implementation 700 can be implemented by a processor-based device, such as a hearing aid (e.g., computing device 200), the hearing-aid client 104, the companion client 106, and/or the server 108. The computing device 200 is representative of the type of computing device that may be present in or used in conjunction with at least some aspects of the hearing-aid client 104, the companion client 106, the server 108 of FIG. 1, or any other device that includes electronic circuitry. For example, the computing device 200 may be used in conjunction with at least some of receiving sensor data, transmitting sensor data, processing received sensor data to obtain environment characteristics and storing, transmitting, or displaying information.

At 702, the hearing aid may obtain sensor data. The sensor data may include data obtained from sensor modules included in sensor modules 270 communicatively (e.g., wired or wirelessly) connected to the hearing aid. The training data may include location data including longitude and latitude (or GPS latitude and longitude signal), luminosity data (or luminosity signal), motion data (or motion signal), altitude and/or barometric pressure data (or barometric pressure signal), and/or microphone data (or microphone signal) derived from the GPS module, the luminosity sensor module, the initial and magnetic sensor module, the barometric pressure sensor module, and the microphone module, respectively. These sensor data may collectively help identify or extract environment characteristics.

At 704, the user 102 may store the obtained sensor data. For example, sensor data, such as data obtained from the one or more sensor modules 270 may be selectively stored to the database 240. For example, the user 102 may record and/or save (e.g., store) the obtained sensor data in the database 240 for a later usage. In one example, the user 102 may be in a time-sensitive situation where the user 120 may not have time to adjust settings or parameters based on current sensor data, but he or she may still want to save (e.g., store) the sensor data, for example, at that very location, and adjust parameters at a later time. In such case, such sensor data may be recorded and stored in the database 240, and later retrieved by the user 102 at user's discretion.

In some implementations, the user 102 may record and/or save the obtained sensor data in the database 240 through user interfaces, such as I/O module 250, including touchscreen, physical button, slider, and a voice recognition interface. The user interface may be a touchscreen from a mobile phone wirelessly connected to the hearing aid.

In some implementations, the user may record and/or save the obtained sensor data in the server 108. For example, the user may save the obtained sensor data in a memory of the server 108 or the cloud storage.

In some implementations, the user may record and/or save the obtained sensor data in a memory of the companion client 106 or a memory of the hearing-aid client 104.

At 706, the user 102 may retrieve the sensor data from the storage or memory of hearing aid and/or from the appropriate locations at where the sensor data is stored. For example, the user 102 may retrieve the sensor data from an external storage device, cloud storage, the companion client 106, etc.

At 708, the hearing aid may obtain user settings corresponding to the sensor data. For example, the user 102 may adjust trainable parameters to personalize the user settings. The trainable parameters may include the shape of the nonlinear gain-frequency response which includes intensity (volume) and gain-frequency slope, depth and speed of automatic noise suppression, selection and speed of adaptive directionality, compression speed, spectral enhancement, frequency compression, etc.

Step 708 is similar in all aspects to step 604. As such, the step 708 may utilize every implementations that are applied in step 604.

At 710, the ML model for the hearing aid may be trained using logged training data and logged user settings.

Step 710 is similar in all aspects to step 606. As such, the step 606 may utilize every implementations that are applied in step 606.

Figure 8:
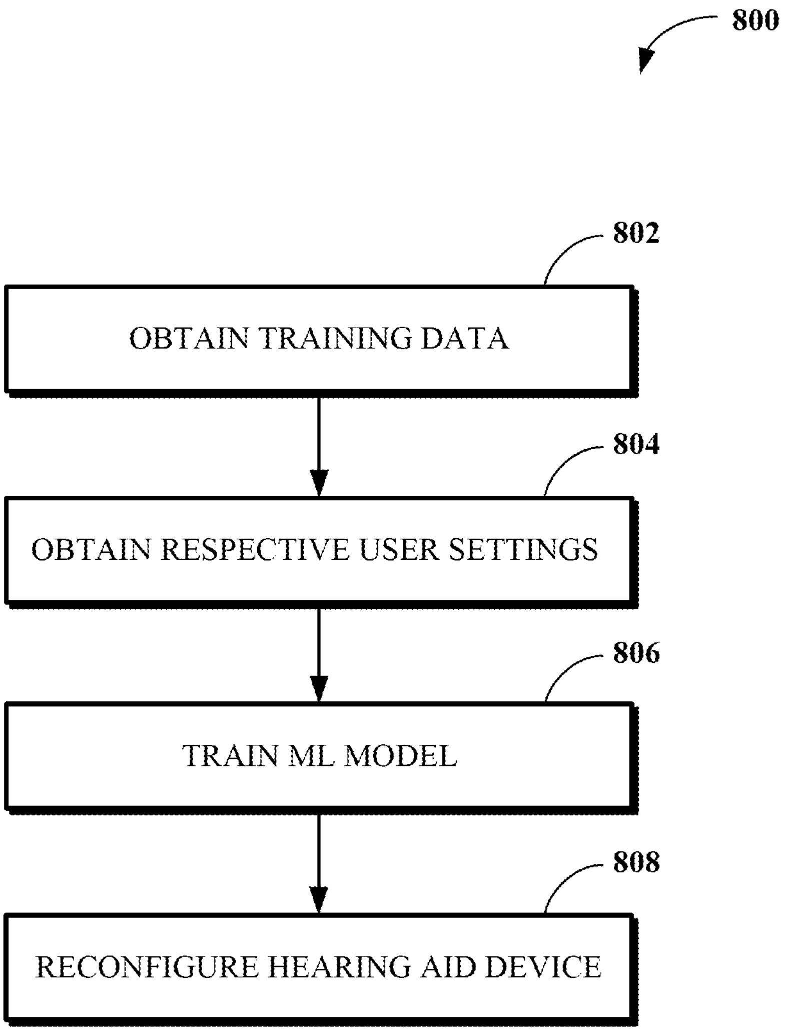
FIG. 8 is a flowchart diagram of an example of a technique for training a machine-learning model using sensor data as training data set.

FIG. 8 is a flowchart diagram of an example of a technique 800 for training an ML model using sensor data as training data set. The technique 800 may be implemented by a processor-based device, such as a hearing aid (e.g., computing device 200), the hearing-aid client 104, the companion client 106, and/or the server 108. The computing device 200 is representative of the type of computing device that may be present in or used in conjunction with at least some aspects of the hearing-aid client 104, the companion client 106, the server 108 of FIG. 1, or any other device that includes electronic circuitry. For example, the computing device 200 may be used in conjunction with at least some of receiving sensor data, transmitting sensor data, processing received sensor data to obtain environment characteristics and storing, transmitting, or displaying information. Further, the technique 800 may be implemented in conjunction with the technique 300, 400, 500, 600, and/or the example implementation 700.

At 802, training data are obtained. The training data may include sensor data obtained from sensors included in a sensor unit, such as the sensor modules 270 of FIG. 2. The sensor data can be obtained from one or more devices, such as a hearing aid, a companion device, or both. The training data can be as described above. For example, each training datum may include location data, such as longitude and latitude (or GPS latitude and longitude signal), luminosity data (or luminosity signal), motion data (or motion signal), altitude and/or barometric pressure data (or barometric pressure signal), and/or microphone data (or microphone signal) derived from a GPS sensor, a luminosity sensor, an inertial and magnetic sensor, a barometric pressure sensor, and a microphone, respectively. These sensor data may collectively be used to identify or extract environmental characteristics.

For example, the user 102 of FIG. 1 may be at certain location and equipped with the hearing aid and/or a companion device, which include embedded sensors or sensors that may be electrically or wirelessly connected to the hearing aid. The sensors may detect various signals associated with the environment characteristics. The sensors may, depending on processing power of the hearing aid, memory configurations and capacity, and/or user preferences, perform continuous real-time detection, periodic detection, or manual detection upon needs of the user. Moreover, not all sensors of the hearing aid need to be initiated. For example, depending on needs of the user or for optimal personalization, sensors may be selectively initiated.

In some implementations, the sensor data may be recorded data stored in a memory, such as the database 240, for later retrieval by the user 102 upon user's convenience. For example, the noises and sounds of the current environment may be recorded for later playback. The recording may be initiated by the user via a user interaction with the companion device or the hearing aid. At a later time, the user may initiate playback of the recoded noises and sounds via the hearing aid (i.e., the user 102 hears the playback through the hearing aid). During the playback, the user 102 can provide the personalized settings, as further described herein. Providing the personalized settings may be a trial-and-error or an iterative process.

At 804, one or more user settings (i.e., training user settings) corresponding to a training datum are obtained. For example, the user 102 may adjust trainable parameters to personalize the user settings. In an example, the user setting may be obtained via an application or software that may be executing or available at the companion device. The training user settings may include or may be processed to obtain the shape of the nonlinear gain-frequency response which includes intensity (volume) and gain-frequency slope, depth and speed of automatic noise suppression, selection and speed of adaptive directionality, compression speed, spectral enhancement, frequency compression, etc.

In some implementations, the application or software may run on either the hearing-aid client 104, the companion client 106, and/or the I/O module 250 of the computing device 200. The user 102 may adjust through user interfaces of the hearing-aid client 104, the companion client 106, and/or the I/O module 250. For example, the user interface may be touchscreen, physical button, slider, voice recognition interface, etc.

In some implementations, the application or software may be configured to generate one or more recommendations that represent different combinations of levels of different parameters of the hearing aid. Such recommendations may be used as a starting point for the user 102 to selectively adjust until a desired hearing level (quality) is achieved by the user 102. Based on the environment characteristics, the user 102 may manually adjust the parameters through user interfaces of the application or software.

When the user 102 encounters a new environment and the user 102 feels uncomfortable or feels the need to adjust the current parameters of the hearing aid, the user 102 may initiate adjustment of the parameters (e.g., training user settings), and such adjustments may signal a training command to train the ML model.

For example, there may be a difference between previous environment characteristics used to configure the hearing aid and the current environment characteristics, and the user may feel the need to adjust the current parameters and initiate adjustment of the parameters.

For example, in volume adjustment mode, the user may make manual adjustments to the overall output volume via the user interface to add or subtract a certain offset (e.g., in 1 dB steps) from current volume level. With regards to gain-frequency response, the user 102 may change the slope of the frequency response until the desired slope is reached. With regards to directionality and its pattern, the user 102 may select among omnidirectional, unidirectional, and bidirectional patterns of the microphone module. With regards to noise suppression, the user 102 may set the signal to noise ratio (SNR). With regards to compression speed, the user 102 may choose the speed ranging from fast to slow compression speed, and set attach time and release time of the compressor. With regards to frequency compression, the user 102 may select compression cut-off frequency and ratio.

Once the user settings corresponding to the training data are obtained, the training data and the obtained user settings (e.g., training user settings) are logged (e.g., stored or transmitted for storage). In some implementations, prior to logging, the technique 800 may be utilized to process and transmit various signals (e.g., from the training data, from the sensor data) to the ML model. In some implementations, during and/or after the logging, the technique 500 may be utilized to combine the various signals (e.g., from the training data, from the sensor data) prior to training the ML model.

At 806, the ML model for the hearing aid may be trained using the logged training data and the corresponding logged user settings. In some implementations, the hearing aid may automatically initiate model training once enough data (i.e., a threshold number of training datums) are logged. In some implementations, the user 102 may initiate (such as via a command provided via a user interface) training of the ML model by the hearing device, the companion device, a server, or some other device that is capable of performing model training.

In some implementations, one or more deep learning models or one or more ML models may be selectively trained depending on the preferences of the user. For example, the user 102 may focus on training the deep learning model based on specific trainable parameters. In this case, the user 102 may select the specific trainable parameters in ML training mode through the user interfaces, such as the I/O module 250. As described above, more than one ML models may be trained.

At 808, the hearing aid may be reconfigured based on the trained ML model. That is, the trained model may be added to the hearing aid. In an example, the trained ML model may be added to a companion device. As such, personalized settings may be obtained from the trained ML model at the companion device and the companion device may transmit commands to the hearing aid to configure the hearing aid based on the personalized settings.

According to disclosure herein, improvements to hearing aid are achieved through the use of processing of sensor data and/or signals to extract environment characteristics, multi-branch architecture to combine various types of signals, and machine-learning technique for personalizing the hearing aid.

One implementation according to this disclosure includes a hearing aid and a server, such as the server 108. The hearing aid is configured to receive at least an audio signal from a microphone and a motion signal from a motion sensor (e.g., inertial and/or magnetic sensor), transmit received signals to the server, receive one or more parameters from the server, and configure the hearing aid based on the one or more parameters. The microphone sensor and the motion sensor may be communicatively (e.g., wired or wirelessly) connected to the hearing device. The parameters can include at least one of a volume level, a gain-frequency response shape, a noise suppression, a selection of microphone directionality, and a frequency compression. The server is configured to receive the audio signal and the motion signal from the hearing aid, generate, using trained deep learning model, the parameters based on at least the audio signal and the motion signal, and transmit the parameters to the hearing aid.

In an example, the server may be further configured to convert, using a log-Mel spectrogram, the audio signal into a processed audio signal, such as the processed audio or microphone signal 502, representing a feature representation of the audio signal. The server may be further configured to convert, using a sensor fusion algorithm, the motion signal into a processed motion signal, such as the processed motion signal 504, representing an orientation information. The orientation information includes at least one of a roll, a pitch, yaw angles, and a gravity-compensated acceleration.

In an example, the server may be further configured to combine the processed audio signal, such as processed audio or microphone signal 502, having two-dimensional images and the processed motion signal, such as processed motion signal 504, having one-dimensional timeseries information using multi-branch architecture for the ML model. The ML model may include a first branch (e.g., the first branch 510) and a second branch (e.g., the second branch 520), and a concatenation layer (e.g., concatenation layer 530). The first branch receives two-dimensional sensor data and converts the two-dimensional sensor data into a first one-dimensional vector via one or more first convolution operations. The two-dimensional sensor data may include sensor data of size N1×N1, such as the sensor data 511, which may include the processed audio or microphone signal and/or log-Mel spectrogram data. The second branch receives one-dimensional sensor data and obtains a second one-dimensional vector via one or more second convolution operations. The one-dimensional sensor data may include sensor data of size N2×1, such as the one-dimensional timeseries data 521 of size N2×1, which may include the processed motion signal. The concatenation layer may combine the first one-dimensional vector and the second one-dimensional vector.

The server may be further configured to receive a location signal from a GPS sensor, an altitude signal from a barometric pressure sensor, and a luminosity signal from a luminosity sensor. The GPS sensor, the barometric pressure sensor, and the luminosity sensor may be communicatively (e.g., wired or wirelessly) connected to the hearing aid. Moreover, the concatenation may further combine the first one-dimensional vector, the second one-dimensional vector, and scalar data, such as the scalar data 532 (including signals related to latitude, longitude, altitude, and/or luminosity).

It should be noted that the applications and implementations of this disclosure are not limited to the examples, and alternations, variations, or modifications of the implementations of this disclosure can be achieved for any computation environment.

It may be appreciated that various changes can be made therein without departing from the spirit and scope of the disclosure. Moreover, the various features of the implementations described herein are not mutually exclusive. Rather any feature of any implementation described herein may be incorporated into any other suitable implementation.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

obtaining training data, wherein each training datum comprises environment characteristics obtained based on sensor data;

obtaining respective user settings corresponding to the training data, wherein at least one respective user setting corresponds to one training datum, and wherein a respective user setting is indicative of a user preference of at least one parameter of a hearing aid device;

training a machine-learning model for the hearing aid device to output values for the at least one parameter; and reconfiguring the hearing aid device based on an output of the machine-learning model, wherein reconfiguring the hearing aid device comprises:

using current environment characteristics as an input to the machine-learning model to obtain at least one current value for the at least one parameter; and configuring the hearing aid device to use at least one current value.

2. The method of claim 1, wherein the sensor data are obtained from sensors of the hearing aid device or a companion device associated with the hearing aid device.

3. The method of claim 1, wherein the training data are playback recording of stored sensor data.

4. The method of claim 1, further comprising:
receiving, after reconfiguring, a training command of the hearing aid device in response to are obtaining, based on the current environment characteristics, user settings corresponding to at least one parameter of the hearing aid device; and
initiating the training the machine-learning model based on the current environment characteristics and the user settings responsive to the training command.

5. The method of claim 1, further comprising:
determining whether to initiate the reconfiguring of the hearing aid device based on a difference between previous environment characteristics used to configure the hearing aid device and the current environment characteristics.

6. The method of claim 1, wherein the sensor data comprise at least one of microphone data, motion data, global positioning system (GPS) data, barometric pressure data, or luminosity data.

7. The method of claim 1, wherein the at least one parameter of the hearing aid device is one of a volume level, a gain-frequency response shape, a noise suppression, a selection of microphone directionality, and frequency compression.

8. A system, comprising:
a hearing aid device, comprising a first processor configured to:
receive a parameter value; and
configure the hearing aid device to use the parameter value; and
a device communicatively connected to the hearing aid device, the device comprising a second processor configured to execute instructions to:
receive sensor data;
extract environment characteristics from the sensor data;
input the environment characteristics to a machine-learning model to obtain the parameter value for a parameter of the hearing aid device; and
transmit a command to the hearing aid device to use the parameter value.

9. The system of claim 8, wherein the sensor data are playback recording of stored sensor data.

10. The system of claim 9, wherein the sensor data comprise at least one of microphone data, motion data, global positioning system (GPS) data, barometric pressure data, or luminosity data.

11. The system of claim 8, wherein:
the first processor is further configured to:
receive a training command; and
transmit the training command to the device; and
the second processor is further configured to execute instructions to:
receive the training command from the first processor of the hearing aid device; and
train, using current sensor data, the machine-learning model responsive to the training command.

12. The system of claim 11, wherein the training command is determined to be received in response to receiving, by the first processor, at least one of a command of a parameter value from the user.

13. The system of claim 11, wherein the training command is determined based on a difference between previous environment characteristics used to configure the hearing aid device and current environment characteristics.

14. The system of claim 8, wherein the parameter is one of a volume level, a gain-frequency response shape, a noise suppression, a selection of microphone directionality, and a frequency compression.

15. A non-transitory computer-readable storage medium, comprising executable instructions that, when executed by a processor, perform operations to:
obtain training data, wherein each training datum comprises environment characteristics obtained based on sensor data;
obtain respective user settings corresponding to the training data,
wherein at least one respective user setting corresponds to one training datum, and
wherein a respective user setting is indicative of a user preference of at least one parameter of a hearing aid device;
train a machine-learning model for the hearing aid device to output values for the at least one parameter; and
reconfigure the hearing aid device based on an output of the machine-learning model, wherein reconfiguring the hearing aid device comprises:
using current environment characteristics as an input to the machine-learning model to obtain at least one current value for the at least one parameter; and
configuring the hearing aid device to use at least one current value.

16. The non-transitory computer-readable storage medium of claim 15, wherein the sensor data are obtained from sensors of the hearing aid device or a companion device associated with the hearing aid device.

17. The non-transitory computer-readable storage medium of claim 15, wherein the training data are playback recording of stored sensor data.

18. The non-transitory computer-readable storage medium of claim 15, wherein the operations further comprise operations to:
receive, after reconfiguring, a training command of the hearing aid device in response to user settings corresponding to at least one parameter of the hearing aid device being obtained based on the current environment characteristics; and
initiate the training the machine-learning model based on the current environment characteristics and the user settings responsive to the training command.

19. The non-transitory computer-readable storage medium of claim 15, wherein the sensor data comprise at least one of microphone data, motion data, global positioning system (GPS) data, barometric pressure data, or luminosity data.

20. The non-transitory computer-readable storage medium of claim 15, wherein the at least one parameter of the hearing aid device is one of a volume level, a gain-frequency response shape, a noise suppression, a selection of microphone directionality, and frequency compression.

* * * * *